F. N. CORDELL.
TIRE ABRADER.
APPLICATION FILED AUG. 28, 1918.

1,317,615.

Patented Sept. 30, 1919.

Inventor:
Frank N. Cordell.
By Hugh K. Wagner,
Attorney.

UNITED STATES PATENT OFFICE.

FRANK N. CORDELL, OF ST. LOUIS, MISSOURI.

TIRE-ABRADER.

1,317,615.    Specification of Letters Patent.    Patented Sept. 30, 1919.

Application filed August 28, 1918. Serial No. 251,826.

*To all whom it may concern:*

Be it known that I, FRANK N. CORDELL, a citizen of the United States, residing at the city of St. Louis, State of Missouri, have invented certain new and useful Improvements in Tire-Abraders, of which the following is a specification.

This invention is an improved abrader for rubber for making repairs in inner tubes for automobile tires and the like. One of its chief merits is its cheapness, and another is its convenience.

In the accompanying drawings forming part of this specification, in which like numbers of reference denote like parts wherever they occur.

Figure 1:
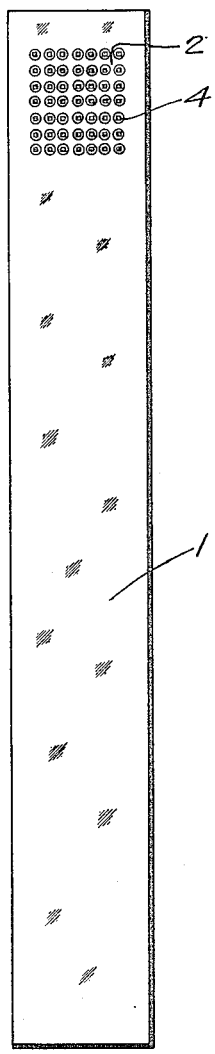
Figure 1 is a bottom plan view.
Figure 2:
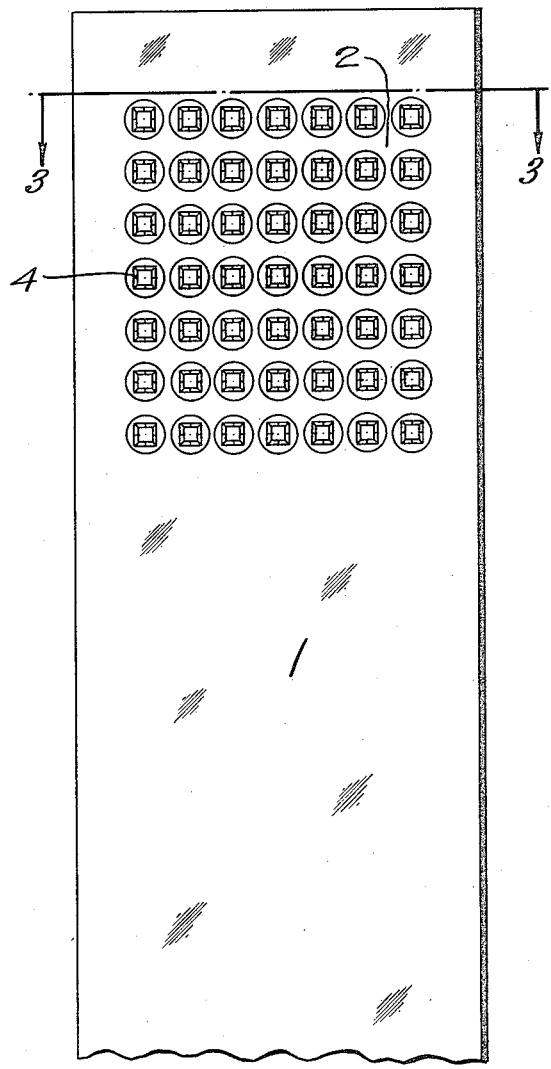
Fig. 2 is a bottom plan view on an enlarged scale of part of this device.
Figure 3:
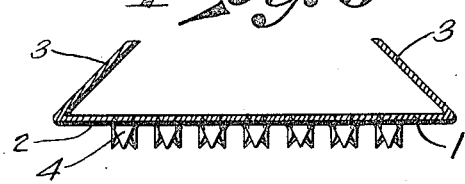
Fig. 3 is a sectional view taken on the lines 3—3 in Fig. 2.

In order that the adhesive material used for attaching a patch over a perforation or puncture in an inner tube of an automobile tire may take hold of the surface of the said tube, it is necessary that the same shall be abraded, so as to roughen the same. The lack of a suitable implement for this purpose has in the past frequently resulted in the application of a patch without this precaution. The result of attachment of a patch without roughening the surface of the inner tube is that after short use the patch becomes detached. This produces another "flat tire," with consequent inconvenience and delay. Every time a car runs even for a few feet on a flat tire, expensive injury to the outer casing or shoe occurs.

The primary purpose of the present invention is to provide so cheap an abrader for the purpose hereinabove indicated that there is no reason for any car being unequipped therewith, and one so convenient to handle and so effective in operation, that it will be used without reluctance.

This device is made out of a long blank of tin or other suitable cheap metal, so as to provide a handle 1 and an abrading face 2, the handle 1 being of such length as to be adapted to be grasped by the hand. To prevent the metal bending, lips 3 are bent back from the body so as to reinforce the abrading face 2 and the handle 1. Abrading prongs 4 are formed by punching a plurality of perforations through the abrading face 2, the metal forced out of the perforations being sharp and forming prongs. Any desired number of such prongs may be provided, and they form a rough surface for abrading.

Having thus described this invention, I hereby reserve the benefit of all changes in form, arrangement, order, or use of parts, as it is evident that many minor changes may be made therein without departing from the spirit of this invention or the scope of the following claims.

I claim:

1. A one piece tool for abrading tires comprising a long flat member to form a handle and a plurality of prongs punched out of the member to form an abrading surface, the prongs being disposed near one end of the member.

2. A one piece tool for abrading tires comprising a long member flat on one surface and provided on each longitudinal edge with a bent over portion to form a reinforcement throughout the length of the member, and a plurality of prongs punched from the member to provide an abrading surface near one end of the member.

In testimony whereof I hereunto affix my signature.

FRANK N. CORDELL.